United States Patent
Sasaki et al.

(10) Patent No.: US 9,638,927 B2
(45) Date of Patent: May 2, 2017

(54) POLARIZATION COMBINER AND OPTICAL MODULATION DEVICE

(71) Applicant: Fujitsu Optical Components Limited, Kawasaki-shi, Kanagawa (JP)

(72) Inventors: Seimi Sasaki, Sagamihara (JP); Kohei Shibata, Isehara (JP); Teruhiro Kubo, Kitahiroshima (JP); Shinji Maruyama, Sapporo (JP); Shintaro Takeuchi, Sapporo (JP); Hiroshi Kato, Kawasaki (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 13 days.

(21) Appl. No.: 14/617,238

(22) Filed: Feb. 9, 2015

(65) Prior Publication Data
US 2015/0253582 A1 Sep. 10, 2015

(30) Foreign Application Priority Data
Mar. 7, 2014 (JP) .................................. 2014-044604

(51) Int. Cl.
G02B 27/28 (2006.01)
G02F 1/025 (2006.01)
G02B 7/18 (2006.01)

(52) U.S. Cl.
CPC ......... *G02B 27/283* (2013.01); *G02B 7/1805* (2013.01); *G02B 27/286* (2013.01); *G02F 1/025* (2013.01)

(58) Field of Classification Search
CPC .... G02B 27/283; G02B 27/286; G02B 27/09; G02B 27/0905; G02B 27/0916;
(Continued)

(56) References Cited

U.S. PATENT DOCUMENTS

| 5,321,539 A | 6/1994 | Hirabayashi et al. |
| 2002/0105984 A1* | 8/2002 | Yamamoto ............ H01S 5/4068 372/44.011 |

(Continued)

FOREIGN PATENT DOCUMENTS

| JP | 5-133800 | 5/1993 |
| JP | 8-179175 | 7/1996 |

(Continued)

*Primary Examiner* — Bumsuk Won
*Assistant Examiner* — Ephrem Mebrahtu
(74) *Attorney, Agent, or Firm* — Staas & Halsey LLP

(57) ABSTRACT

A polarization combiner includes: a base member that includes a body portion, an arm portion extending from the body portion, and a notch portion surrounded with the body portion and the arm portion; a polarization rotating element that is fixed to the arm portion of the base member and that rotates a polarization direction of a first polarized wave; and a polarization combining element that is fixed to the base member so as to face the notch portion of the base member and the polarization rotating element, the polarization combining element combining two polarized waves entering from a surface facing the notch portion and the polarization rotating element, the two polarized waves including the first polarized wave whose polarization direction is rotated by the polarization rotating element and a second polarized wave passing the notch portion.

9 Claims, 11 Drawing Sheets

(58) Field of Classification Search
CPC ...... G02B 27/10; G02B 27/106; G02B 27/14;
G02B 6/2817; G02B 6/2821; G02B
6/2861; G02B 7/1805
USPC .... 359/246, 629–640; 372/26, 27, 106, 107,
372/108
See application file for complete search history.

(56) References Cited

U.S. PATENT DOCUMENTS

| | | |
|---|---|---|
| 2007/0279738 A1 | 12/2007 | Suh et al. |
| 2012/0038973 A1 | 2/2012 | Martinez, III et al. |
| 2012/0250136 A1 | 10/2012 | Maie et al. |

FOREIGN PATENT DOCUMENTS

| | | |
|---|---|---|
| JP | 4690891 | 2/2011 |
| JP | 2012-203283 | 10/2012 |
| JP | 2013-543137 | 11/2013 |

* cited by examiner

POLARIZATION COMBINER AND OPTICAL MODULATION DEVICE

CROSS-REFERENCE TO RELATED APPLICATION

This application is based upon and claims the benefit of priority of the prior Japanese Patent Application No. 2014-044604, filed on Mar. 7, 2014, the entire contents of which are incorporated herein by reference.

FIELD

The embodiments discussed herein are related to a polarization combiner and an optical modulation device.

BACKGROUND

Generally, optical transmission systems may use optical modulators which perform optical modulation by using, for example, a dual polarization differential quadrature phase shift keying (DP-QPSK) scheme. In the DP-QPSK scheme, a light beam input to the optical modulator is split into two light beams. After an electrical signal is superimposed on each of these two light beams, the two light beams are combined.

To superimpose electrical signals on two split light beams, ferroelectric crystal such as lithium niobate ($LiNbO_3$) may be used. When ferroelectric crystal is used, the electrical signals are superimposed on the light beams in waveguides inside the crystal. In order to do so, crystal having a prescribed size needs to be placed. This poses a certain limit to downsizing of the optical modulators. Accordingly, the optical modulators formed by using a semiconductor chip have been examined in recent years to implement downsized and high-efficiency optical modulators.

To combine two light beams, a polarization coupler including a polarization rotating element and a polarization combining element may be used. The polarization coupler rotates the polarization direction of one light beam, out of two light beams which travel side by side, by using a polarization rotating element such as a wave plate, and combines these two light beams whose polarization directions are perpendicular to each other by using a polarization combining element such as a polarization beam combiner (PBC) prism. Specifically, when a light beam 31 passes through a wave plate 20, the polarization direction of the light beam 31 becomes perpendicular to the polarization direction of a light beam 32 as illustrated in FIG. 11 for example. Since a PBC prism 10 has a polarized light separating film provided to reflect the polarized light beam 31 and to transmit the polarized light beam 32, the light beam 31 is reflected on the polarized light separating film and is combined with the light beam 32 which passes through the polarized light separating film.

Patent Document 1: Japanese Laid-open Patent Publication No. 05-133800

The aforementioned polarization coupler is generally configured so that the wave plate 20 is bonded to the PBC prism 10 as illustrated in FIG. 11. More specifically, the polarization rotating element is fixed to the polarization combining element with fixatives such as adhesives. In this case, the fixatives applied to a bonding surface between the polarization rotating element and the polarization combining element may overflow to the periphery of the bonding surface, and this may lead to formation of a region called a fillet.

The fillet formed of the fixatives hinders passage of light beams. Accordingly, when two light beams are combined in the aforementioned polarization coupler, incident positions of these two light beams are adjusted so that the light beams pass along the routes that circumvent the fillet. Specifically, in the configuration of the polarization coupler illustrated in FIG. 11 for example, the light beam 32 is made incident on the PBC prism 10 at a position away from the periphery of the bonding surface between the PBC prism 10 and the wave plate 20. Since the incident position of the light beam 32 is adjusted in this way, the fillet formed around the bonding surface between the PBC prism 10 and the wave plate 20 does not hinder passage of the light beam 32.

However, in the case of inputting two light beams into such a polarization coupler, it is difficult to reduce a distance between two light beams to a fixed value or less. More specifically, for example in FIG. 11, the light beam 32 is made incident on the PBC prism 10 at a position away from the periphery of the bonding surface between the PBC prism 10 and the wave plate 20. Accordingly, a fixed interval is provided between the light beam 31 and the light beam 32. As a result, when the above-described polarization coupler is applied to, for example, optical modulators, two light beams with electrical signals superimposed thereon are distanced from each other. This makes it difficult to achieve sufficient downsizing of the optical modulators. This also applies to devices other than the optical modulators. In the devices including the aforementioned polarization coupler to combine two light beams, these two light beams are placed at a certain interval. As a result, downsizing is disadvantageously limited.

SUMMARY

According to an aspect of an embodiment, a polarization combiner includes: a base member that includes a body portion, an arm portion extending from the body portion, and a notch portion surrounded with the body portion and the arm portion; a polarization rotating element that is fixed to the arm portion of the base member and that rotates a polarization direction of a first polarized wave; and a polarization combining element that is fixed to the base member so as to face the notch portion of the base member and the polarization rotating element, the polarization combining element combining two polarized waves entering from a surface facing the notch portion and the polarization rotating element, the two polarized waves including the first polarized wave whose polarization direction is rotated by the polarization rotating element and a second polarized wave passing the notch portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments are not intended to limit the present invention.

[a] First Embodiment

Figure 1:
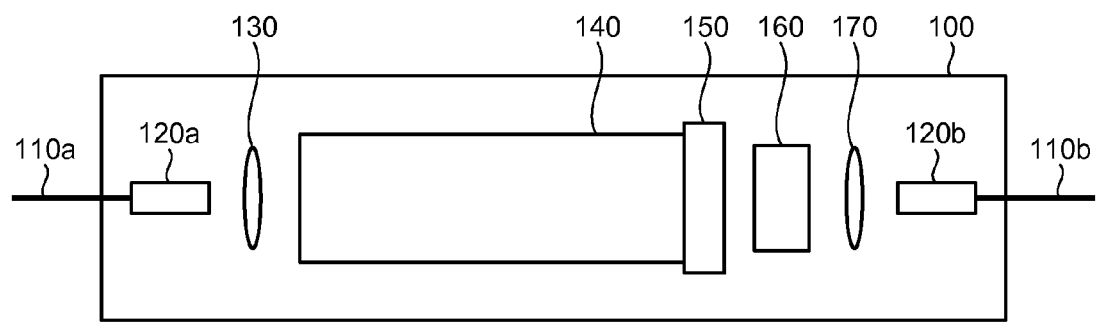
FIG. 1 is a diagram illustrating a configuration of an optical modulator according to a first embodiment.

FIG. 1 is a diagram illustrating the configuration of an optical modulator 100 according to the first embodiment. The optical modulator 100 illustrated in FIG. 1 is connected to optical fibers 110a and 110b. The optical modulator 100 includes ferrules 120a and 120b, a lens 130, an optical modulation chip 140, a microlens array (hereinbelow abbreviated as MLA) 150, a polarization coupler 160, and a lens 170.

The ferrules 120a and 120b accommodate ends of the optical fibers 110a and 110b, respectively, and fix the positions of the optical fibers 110a and 110b. In the optical modulator 100 illustrated in FIG. 1, signal light is input from the optical fiber 110a and the ferrule 120a, and is output from the ferrule 120b and the optical fiber 110b.

The lens 130 condenses the signal light emitted from the end of the optical fiber 110a accommodated in the ferrule 120a, and inputs the obtained light beam to the optical modulation chip 140.

The optical modulation chip 140, which is formed of a semiconducting material, splits the light beam input from the lens 130 into two light beams, and superimposes electrical signals on the respective light beams. The optical modulation chip 140 then outputs the two light beams to the polarization coupler 160 via the MLA 150. The optical modulation chip 140 may output a monitoring light beam for monitoring the operation of the optical modulation chip 140 besides the two light beams having the electrical signals superimposed thereon.

The MLA 150 outputs the light beams on which the electrical signals are superimposed by the optical modulation chip 140, toward the polarization coupler 160. That is, the MLA 150 outputs two light beams which travel side by side to the polarization coupler 160. The two light beams output by the MLA 150 have an identical polarization direction.

The polarization coupler 160 combines two light beams output from the MLA 150, and outputs a light beam including two polarized waves whose polarization directions are perpendicular to each other. More specifically, the polarization coupler 160 rotates the polarization direction of one light beam output from the MLA 150, and then combines this light beam with the other light beam. The polarization coupler 160 outputs the obtained light beam. In the present embodiment, since the fillet formed from fixatives is not present in between two light beams incident on the polarization coupler 160, the two light beams can be positioned close to each other. As a result, even when the optical modulation chip 140 is downsized to a maximum extent, the two light beams output from the optical modulation chip 140 can be combined by the polarization coupler 160. A specific configuration of the polarization coupler 160 will be described in detail later.

The lens 170 projects the light beam output from the polarization coupler 160 to the end of the optical fiber 110b accommodated in the ferrule 120b.

Figure 2:
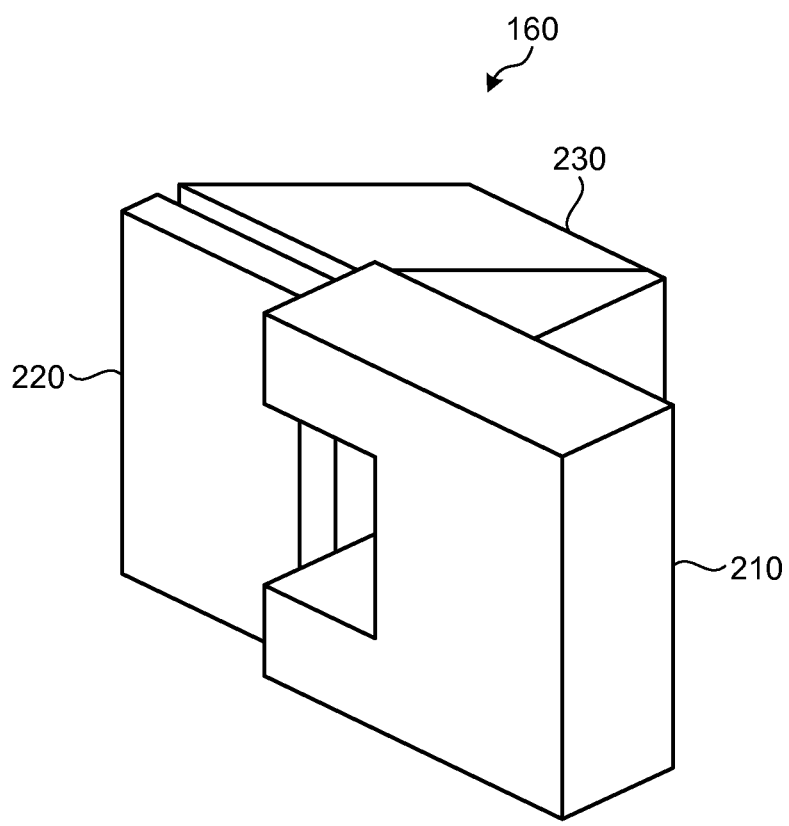
FIG. 2 is a perspective view illustrating a configuration of a polarization coupler according to the first embodiment.

FIG. 2 is a perspective view illustrating the configuration of the polarization coupler 160 according to the first embodiment. As illustrated in FIG. 2, the polarization coupler 160 includes a base member 210, a wave plate 220, and a PBC prism 230.

The base member 210 is formed from, for example, a glass material, and serves as a base material to which the wave plate 220 and the PBC prism 230 are bonded. That is, the wave plate 220 is bonded to one surface of the base member 210, while the PBC prism 230 is bonded to another surface. The base member 210 may be formed from a material whose thermal expansion coefficient is close to the thermal expansion coefficients of the materials forming the wave plate 220 and the PBC prism 230. The base member 210 may be formed from, for example, a metal material as long as they fulfill this condition.

The wave plate 220 is a half-wave plate which is formed from, for example, a Quartz crystal and which rotates the polarization direction of one light beam, which is output from the optical modulation chip 140, 90 degrees. That is, the wave plate 220 functions as a polarization rotating element that rotates the polarization direction of one light beam out of two light beams output from the optical modulation chip 140.

The PBC prism 230 is formed from, for example, silica glass, and combines two light beams output from the optical modulation chip 140. Specifically, a light beam incoming without passing through the wave plate 220 passes and travels straight through the PBC prism 230, while a light beam incoming through the wave plate 220 is reflected inside the PBC prism 230. The PBC prism 230 combines these light beams and outputs a combined light beam. In other words, the PBC prism 230 functions as a polarization combining element that combines two light beams output from the optical modulation chip 140.

Figure 3:
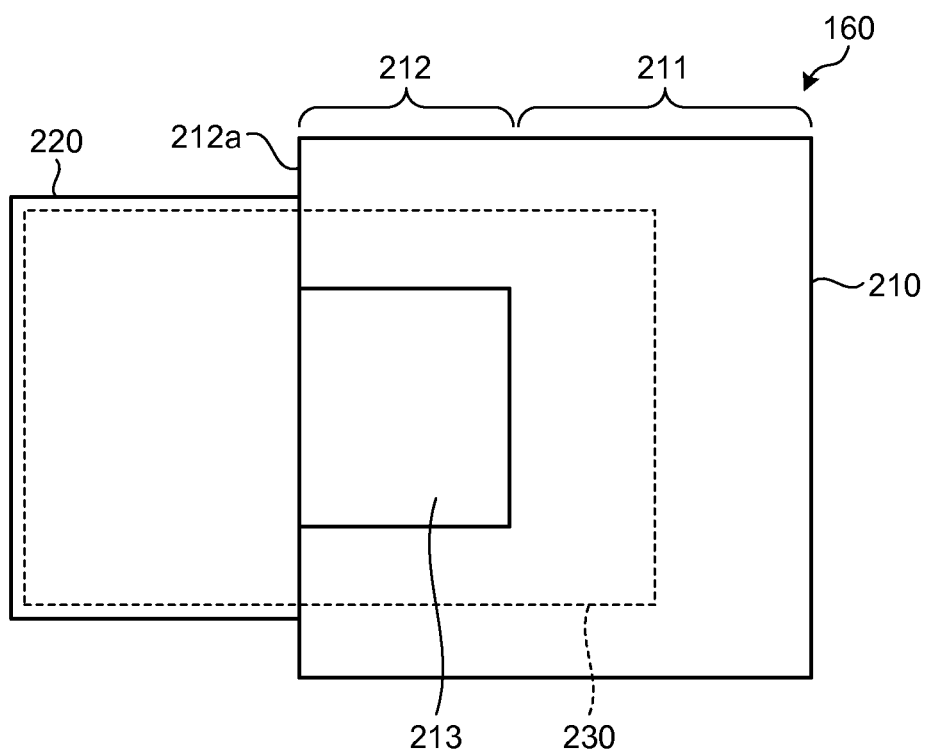
FIG. 3 is a front view illustrating the configuration of the polarization coupler according to the first embodiment.

FIG. 3 is a front view illustrating the configuration of the polarization coupler 160 according to the first embodiment. In FIG. 3, two light beams output from the optical modulation chip 140 enter the polarization coupler 160 from the near side to the back side.

As illustrated in FIG. 3, the base member 210 is substantially U-shaped. More specifically, the base member 210 has two arm portions 212 extending from a body portion 211, with a notch portion 213 being formed between the two arm portions 212. The wave plate 220 is bonded to an end face 212a of the arm portion 212. The PBC prism 230 illustrated with a broken line in FIG. 3 is bonded to back-side surfaces of the body portion 211 and the arm portion 212 at a position facing the notch portion 213 and the wave plate 220. More specifically, the wave plate 220 and the PBC prism 230 are each positioned when they are bonded to the base member 210. Therefore, the wave plate 220 and the PBC prism 230 are not directly bonded to each other.

In such a configuration, out of two light beams output from the optical modulation chip 140, one light beam passes through the wave plate 220 and then enters the PBC prism 230. The other light beam passes through the notch portion 213, and directly enters the PBC prism 230. In this case, since the base member 210 has the notch portion 213 formed between two arm portions 212, any portion that bonds two members is not present in between the light beam incident on the wave plate 220 and the light beam passing through the notch portion 213. More specifically, the fillet formed by an adhesive or the like overflowing from the bonding surface is not present in between the light beam incident on the wave plate 220 and the light beam passing through the notch portion 213. As a result, even when a distance between the light beam incident on the wave plate 220 and the light beam passing through the notch portion 213 is reduced, passage of the light beams is not hindered by the fillet. Therefore, even when the optical modulation chip 140 is downsized and a pitch between two light beams is reduced, these two light beams can still be combined by the polarization coupler 160.

Figure 4:
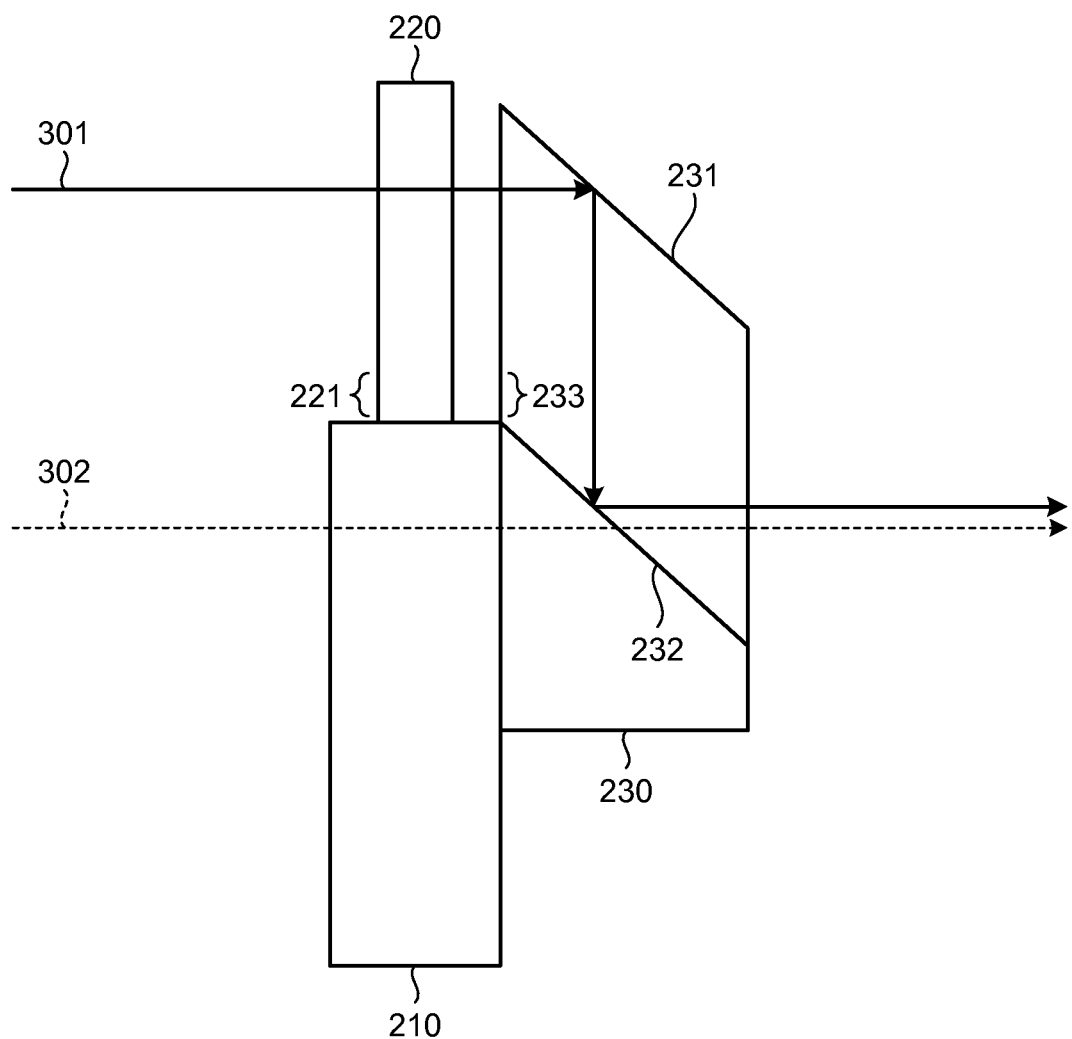
FIG. 4 is a plan view illustrating the configuration of the polarization coupler according to the first embodiment.

FIG. 4 is a plan view illustrating the configuration of the polarization coupler 160 according to the first embodiment. As illustrated in FIG. 4, a light beam 301 output from the optical modulation chip 140 passes through the wave plate 220 and then enters the PBC prism 230, while a light beam 302 passes through the notch portion 213 of the base member 210 and directly enters the PBC prism 230.

In this case, an optically invalid region 221 is provided in a peripheral edge portion of the wave plate 220 as a region which is optically not valid due to minute cracks and the like generated during processing such as cutting and polishing. Similarly, reflection films 231 and 232 having polarization selectivity are formed on the PBC prism 230, and an optically invalid region 233 is provided in the vicinity of the reflection film 232. Accordingly, the light beam 301 enters the wave plate 220 without passing the optically invalid region 221 and the optically invalid region 233.

In the present embodiment, the position where the PBC prism 230 is bonded to the base member 210 is adjusted, so that the optically invalid region 221 and the optically invalid region 233 overlap with each other as viewed along the traveling direction of the light beams 301 and 302. Accordingly, a substantial width of the optically invalid region between the light beam 301 and the light beam 302 is minimized, and so the pitch between the light beam 301 and the light beam 302 can further be reduced.

The reflection films 231 and 232 of the PBC prism 230 are formed from, for example, a dielectric multilayer or the like. The reflection films 231 and 232 reflect a light beam of a specified polarization direction while transmitting a light beam whose polarization direction is perpendicular to the aforementioned light beam. In the present embodiment, the polarization direction of the light beam 301 is rotated 90 degrees by the wave plate 220. Accordingly, at the time when the light beam 301 enters the PBC prism 230, the polarization directions of the light beam 301 and the light beam 302 are perpendicular to each other. Therefore, the light beam 301 is reflected on the reflection films 231 and 232, while the light beam 302 passes through the reflection film 232. As a result, the light beams 301 and 302 whose polarization directions are perpendicular to each other are combined, and the obtained light beam is output to the lens 170.

As described in the foregoing, according to the present embodiment, the wave plate and the PBC prism are bonded to the base member having the arm portions and the notch portion, so that the wave plate and the PBC prism are not directly bonded. Out of two light beams which are output from the optical modulation chip and travel side by side, one light beam passes through the wave plate bonded to the top ends of the arm portions of the base member, while the other light beam passes through the notch portion. Both the light beams then enter the PBC prism. Accordingly, any portion that bonds two members is not present in between the two light beams, and so the fillet formed with an adhesive or the like is not present either. As a result, even when the pitch between the two light beams is reduced, passage of the light beams is not hindered and thereby downsizing of the devices can be promoted.

[b] Second Embodiment

A second embodiment is characterized by the point that a phase correction plate is bonded to the vicinity of the notch portion of the base member so as to allow the phases of two light beams traveling side by side to coincide with each other.

Since an optical modulator according to the second embodiment is similar in configuration to the optical modulator 100 according to the first embodiment, the description thereof will be omitted. In the second embodiment, the configuration of the polarization coupler 160 is different from that in the first embodiment.

Figure 5:
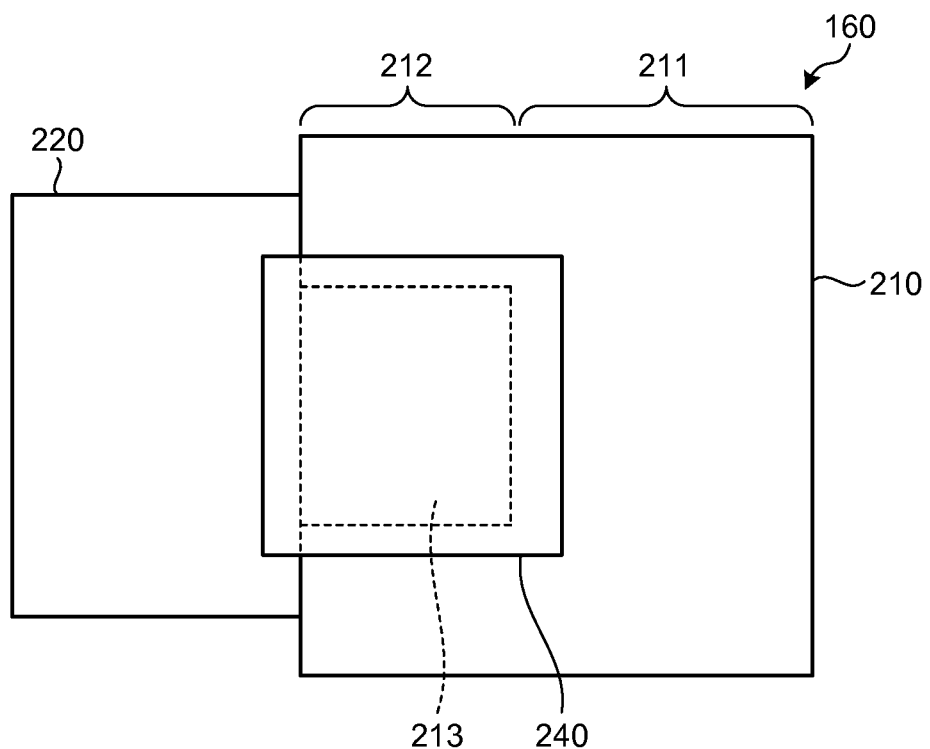
FIG. 5 is a front view illustrating a configuration of a polarization coupler according to a second embodiment.

FIG. 5 is a front view illustrating the configuration of the polarization coupler 160 according to the second embodiment. In FIG. 5, portions identical to those in FIG. 3 are denoted by identical reference numerals and the description thereof will be omitted. In FIG. 5, two light beams output from the optical modulation chip 140 enter the polarization coupler 160 from the near side to the back side.

As illustrated in FIG. 5, in the present embodiment, a phase correction plate 240 is placed so as to cover the notch portion 213 of the base member 210. That is, the phase correction plate 240 is bonded to the periphery of the notch portion 213 of the base member 210. The light beam that passes the wave plate 220 receives a phase delay. The phase correction plate 240 imparts a phase delay identical to the above-stated phase delay to a light beam that passes through the phase correction plate 240. However, the phase correction plate 240 does not change the polarization direction of the light beam that passes through the phase correction plate 240.

In such a configuration, out of two light beams output from the optical modulation chip 140, one light beam passes through the wave plate 220 and then enters the PBC prism 230. The other light beam passes through the phase correction plate 240 and the notch portion 213, and then enters the PBC prism 230. In this case, the phase correction plate 240 is bonded to three sides of the base member 210 while surrounding the notch portion 213. However, any portion that bonds the members is not present in between the light beam incident on the wave plate 220 and the light beam incident on the phase correction plate 240. More specifically, the fillet formed by an adhesive or the like overflowing from the bonding surface is not present in between the light beam incident on the wave plate 220 and the light beam incident on the phase correction plate 240. As a result, even when a distance between the light beam incident on the wave plate 220 and the light beam incident on the phase correction plate 240 is reduced, the passage of the light beams is not hindered by the fillet. Therefore, even when the optical modulation chip 140 is downsized and the pitch between two light beams is reduced, these two light beams can still be combined by the polarization coupler 160.

Figure 6:
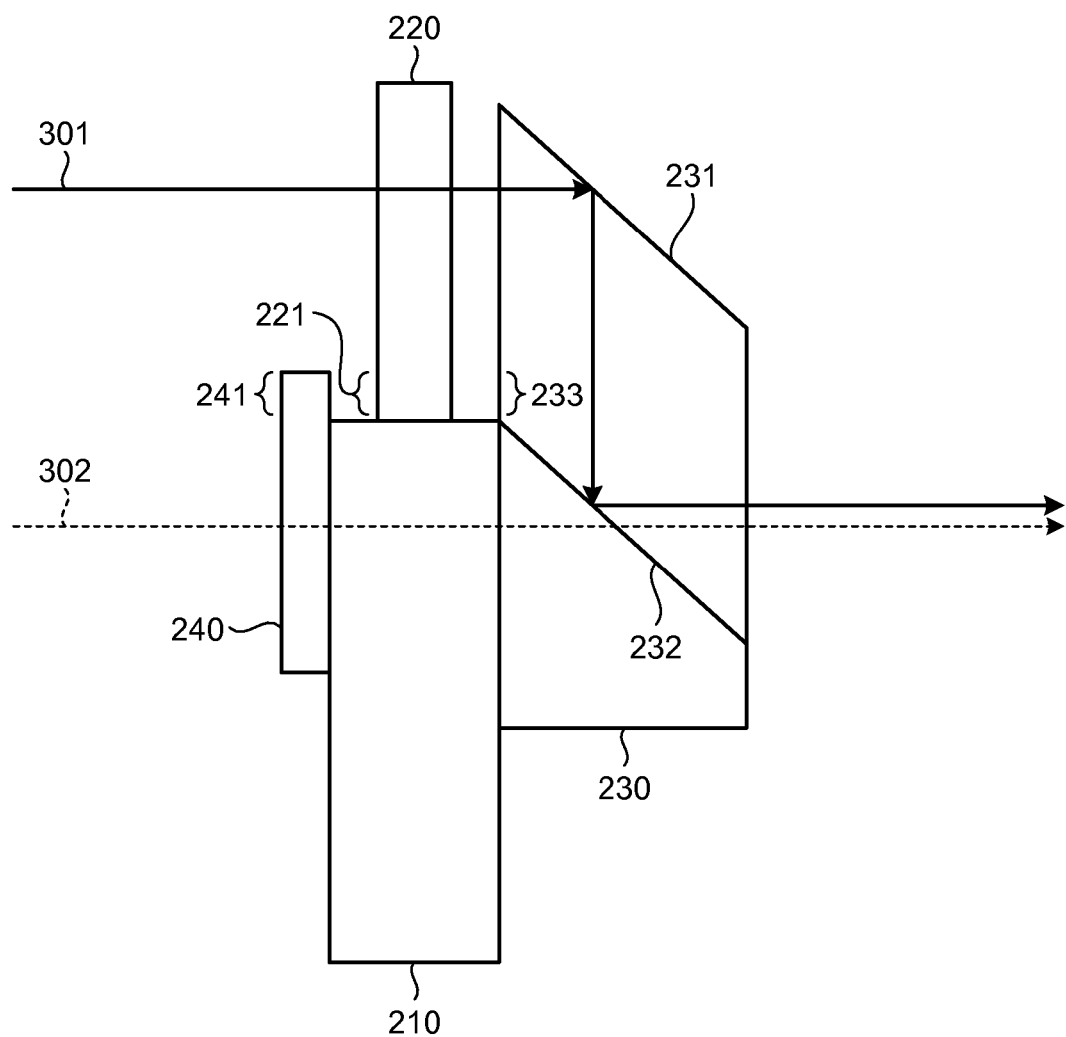
FIG. 6 is a plan view illustrating the configuration of the polarization coupler according to the second embodiment.

FIG. 6 is a plan view illustrating the configuration of the polarization coupler 160 according to the second embodiment. In FIG. 6, portions identical to those in FIG. 4 are denoted by identical reference numerals and the description thereof will be omitted. As illustrated in FIG. 6, a light beam 301 output from the optical modulation chip 140 passes through the wave plate 220 and then enters the PBC prism 230, while a light beam 302 passes through the phase correction plate 240 and the notch portion 213 of the base member 210 and then enters the PBC prism 230.

In this case, an optically invalid region 241 similar to those in the wave plate 220 and the PBC prism 230 is provided in a peripheral edge portion of the phase correction plate 240. Accordingly, the light beams 301 and 302 respectively enter the wave plate 220 and the phase correction plate 240 without passing through the optically invalid regions 221, 233, and 241.

In the present embodiment, the positions where the PBC prism 230 and the phase correction plate 240 are bonded to the base member 210 are adjusted, so that the optically invalid regions 221, 233, and 241 overlap with each other as viewed along the traveling direction of the light beams 301 and 302. Accordingly, a substantial width of the optically invalid region in between the light beam 301 and the light beam 302 is minimized, and so the pitch between the light beam 301 and the light beam 302 can further be reduced.

In the present embodiment, when the light beam 301 passes through the wave plate 220, the polarization direction of the light beam 301 is rotated 90 degrees and also a specified phase delay occurs in the light beam 301. However, a phase delay identical to this phase delay is also imparted to the light beam 302 by the phase correction plate 240. Accordingly, at the time when the light beams 301 and 302 enter the PBC prism 230, their polarization directions are perpendicular to each other but their phases are allowed to coincide with each other.

According to the present embodiment as described in the foregoing, out of two light beams which are output from the optical modulation chip and travel side by side, one light beam passes through the wave plate, and thereby a phase delay is imparted thereto. In this case, an identical phase delay is also imparted to the other light beam by the phase correction plate. Accordingly, the phases of two light beams incident on the PBC prism can be allowed to coincide with each other.

Although the phase correction plate 240 is bonded to the periphery of the notch portion 213 in the present embodiment, the phase correction plate 240 may be contained in the notch portion 213. In this case, respective sides of the phase correction plate 240 are bonded to the inner surfaces of the body portion 211 and the arm portions 212 which form the notch portion 213.

In the present embodiment, the phase correction plate 240 is bonded to the periphery of the notch portion 213. However, an optical element having a function other than the phase correction function may be bonded to the periphery of the notch portion 213. For example, a wave plate for rotating the polarization direction of light beams, like the wave plate 220, may be bonded to the periphery of the notch portion 213. In short, when an optical element that optically changes a light beam is bonded to the periphery of the notch portion 213, the light beam that passes through the notch portion 213 may optically be changed. If the wave plate is bonded to the periphery of the notch portion 213, the wave plate and the wave plate 220 may rotate the polarization directions of light beams 45 degrees in directions opposite to each other for example. This makes it possible to set the polarization directions of these two light beams perpendicular to each other and to allow their phase delays to coincide with each other.

[c] Third Embodiment

A third embodiment is characterized by the point that the arm portion of the base member is further extended to widen the bonding surface between the base member and the wave plate, so that the wave plate is reliably fixed.

Since an optical modulator according to the third embodiment is similar in configuration to the optical modulator 100 according to the first embodiment, the description thereof will be omitted. In the third embodiment, the configuration of the polarization coupler 160 is different from that in the first embodiment.

Figure 7:
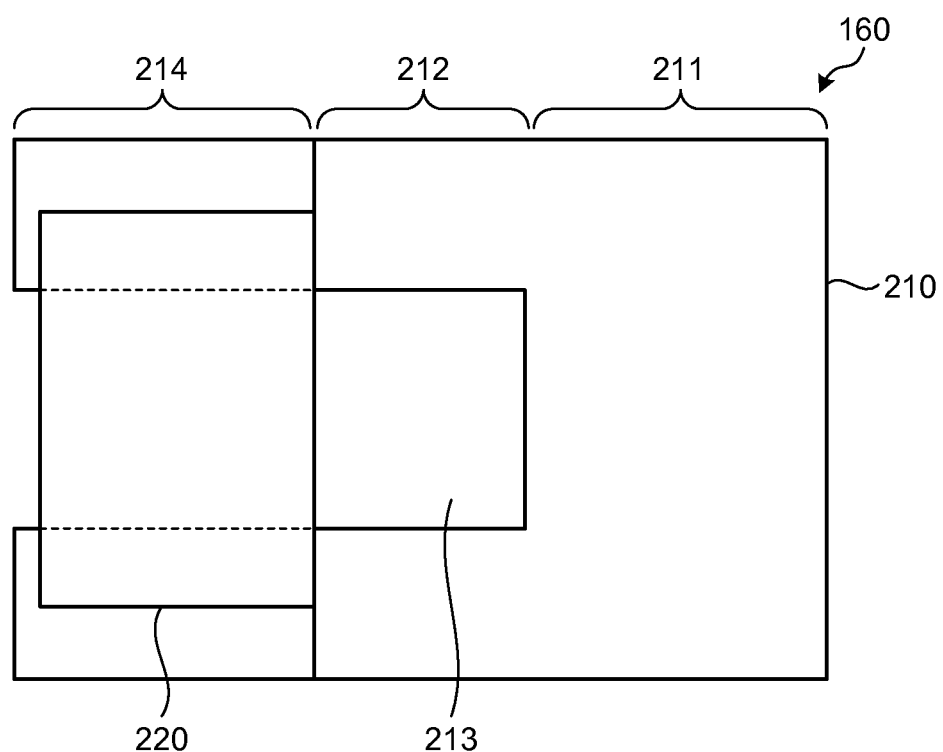
FIG. 7 is a front view illustrating a configuration of a polarization coupler according to a third embodiment.

FIG. 7 is a front view illustrating the configuration of the polarization coupler 160 according to the third embodiment. In FIG. 7, portions identical to those in FIG. 3 are denoted by identical reference numerals and the description thereof will be omitted. In FIG. 7, two light beams output from the optical modulation chip 140 enter the polarization coupler 160 from the near side to the back side.

As illustrated in FIG. 7, support arm portions 214 further extend from the top ends of the arm portions 212 of the base member 210 in the present embodiment. Both ends of the wave plate 220 are bonded to surfaces of the two support arm portions 214 which are vertical to a thickness direction of the support arm portions 214.

According to such a configuration, as in the first embodiment, even when a distance between the light beam incident on the wave plate 220 and the light beam passing through the notch portion 213 is reduced, the passage of the light beams is not hindered by the fillet. Therefore, even when the optical modulation chip 140 is downsized and the pitch between two light beams is reduced, these two light beams can still be combined by the polarization coupler 160. Since the wave plate 220 is bonded to relatively wide surfaces of the support arm portions 214, the wave plate 220 can firmly be fixed.

Figure 8:
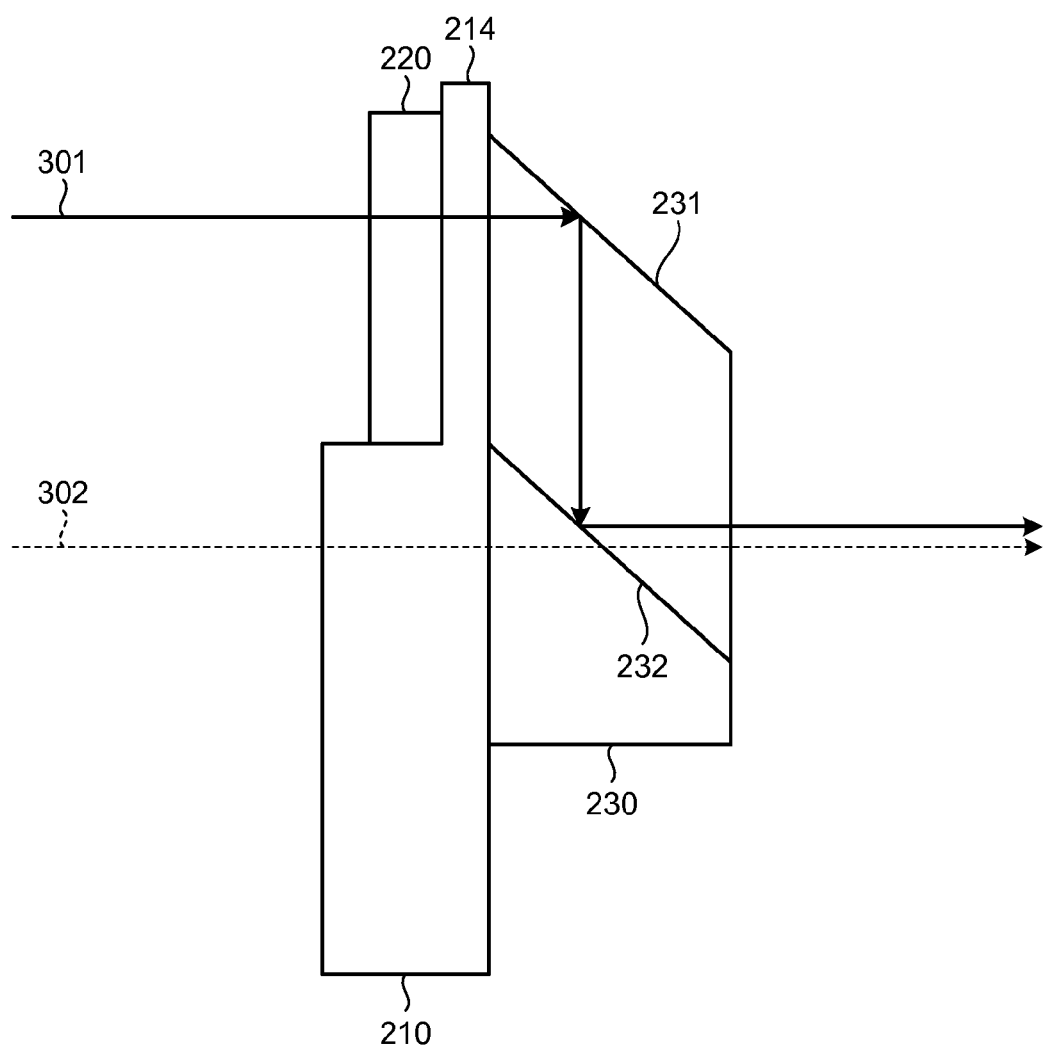
FIG. 8 is a plan view illustrating the configuration of the polarization coupler according to the third embodiment.

FIG. 8 is a plan view illustrating the configuration of the polarization coupler 160 according to the third embodiment. As illustrated in FIG. 8, a light beam 301 output from the optical modulation chip 140 passes through the wave plate 220 and then enters the PBC prism 230, while a light beam 302 passes through the notch portion 213 of the base member 210 and directly enters the PBC prism 230.

The support arm portions 214 of the base member 210 are thinner than the body portion 211 and the arm portions 212. Accordingly, even when the wave plate 220 is bonded to the support arm portions 214, the combined thickness of the wave plate 220 and the support arm portion 214 does not surpass the thickness of the body portion 211 and the arm portion 212. Therefore, the wave plate 220 does not project from the surface of the base member 210.

In the present embodiment, after passing through the wave plate 220, the light beam 301 enters the PBC prism 230 through between the two support arm portions 214. The light beam 302 passes through the notch portion 213 between the two arm portions 212 and enters the PBC prism 230. The light beam 301 is then reflected on the reflection films 231 and 232, while the light beam 302 passes through the reflection film 232. As a result, the light beams 301 and 302 whose polarization directions are perpendicular to each other are combined, and the obtained light beam is output to the lens 170.

As described in the foregoing, according to the present embodiment, the support arm portions further extend from the arm portions of the base member, and the wave plate is bonded to the surfaces of the support arm portions which are vertical to the thickness direction of the support arm portions. Accordingly, a bonding surface where the wave plate and the base member are bonded can be widened, so that the wave plate can firmly be fixed.

[d] Fourth Embodiment

A fourth embodiment is characterized by the point that molding of the base member is facilitated by forming the base member into a substantially L-shape.

Since an optical modulator according to the fourth embodiment is similar in configuration to the optical modulator 100 according to the first embodiment, the description thereof will be omitted. In the fourth embodiment, the configuration of the polarization coupler 160 is different from that in the first embodiment.

Figure 9:
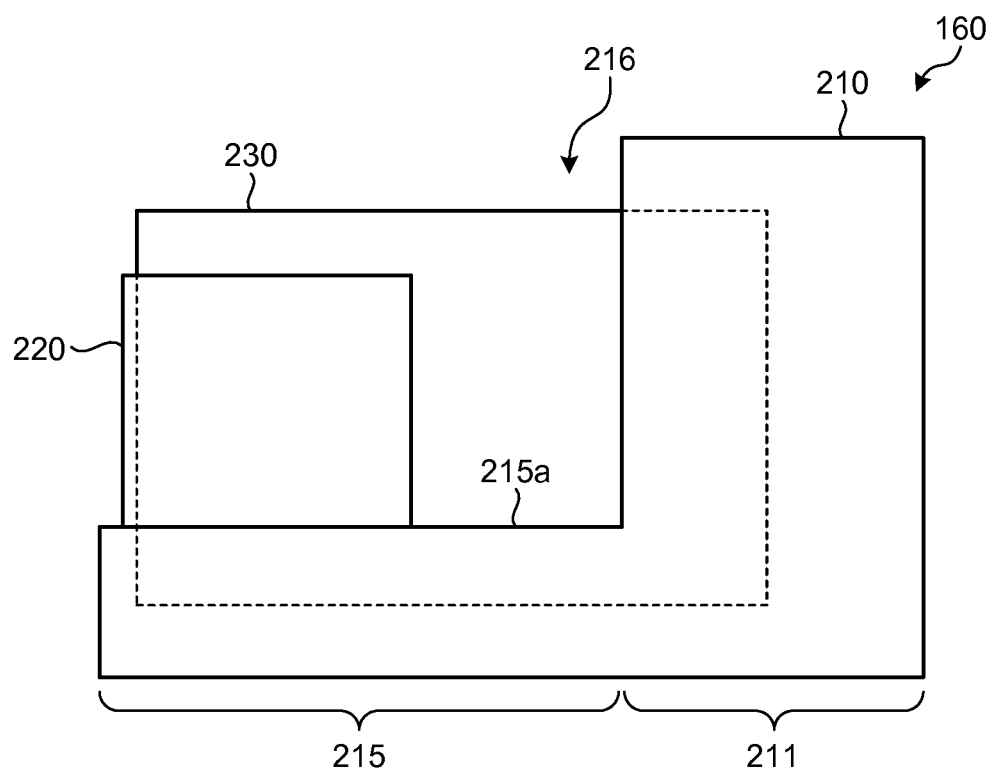
FIG. 9 is a front view illustrating a configuration of a polarization coupler according to a fourth embodiment.

FIG. 9 is a front view illustrating the configuration of the polarization coupler 160 according to the fourth embodiment. In FIG. 9, portions identical to those in FIG. 3 are denoted by identical reference numerals and the description thereof will be omitted. In FIG. 9, two light beams output from the optical modulation chip 140 enter the polarization coupler 160 from the near side to the back side.

As illustrated in FIG. 9, in the present embodiment, the base member 210 includes a body portion 211 and one arm portion 215, and they are substantially L-shaped as a whole. The wave plate 220 is placed in a notch portion 216 surrounded with the body portion 211 and the arm portion 215. More specifically, one side of the wave plate 220 is bonded to an inner surface 215a of the arm portion 215.

According to such a configuration, as in the first embodiment, even when a distance between the light beam incident on the wave plate 220 and the light beam passing through the notch portion 216 is reduced, the passage of the light beams is not hindered by the fillet. Therefore, even when the optical modulation chip 140 is downsized and the pitch between two light beams is reduced, these two light beams can still be combined by the polarization coupler 160. Since the base member 210 has a substantially L-shaped simple configuration, molding of the base member 210 can be facilitated.

Figure 10:
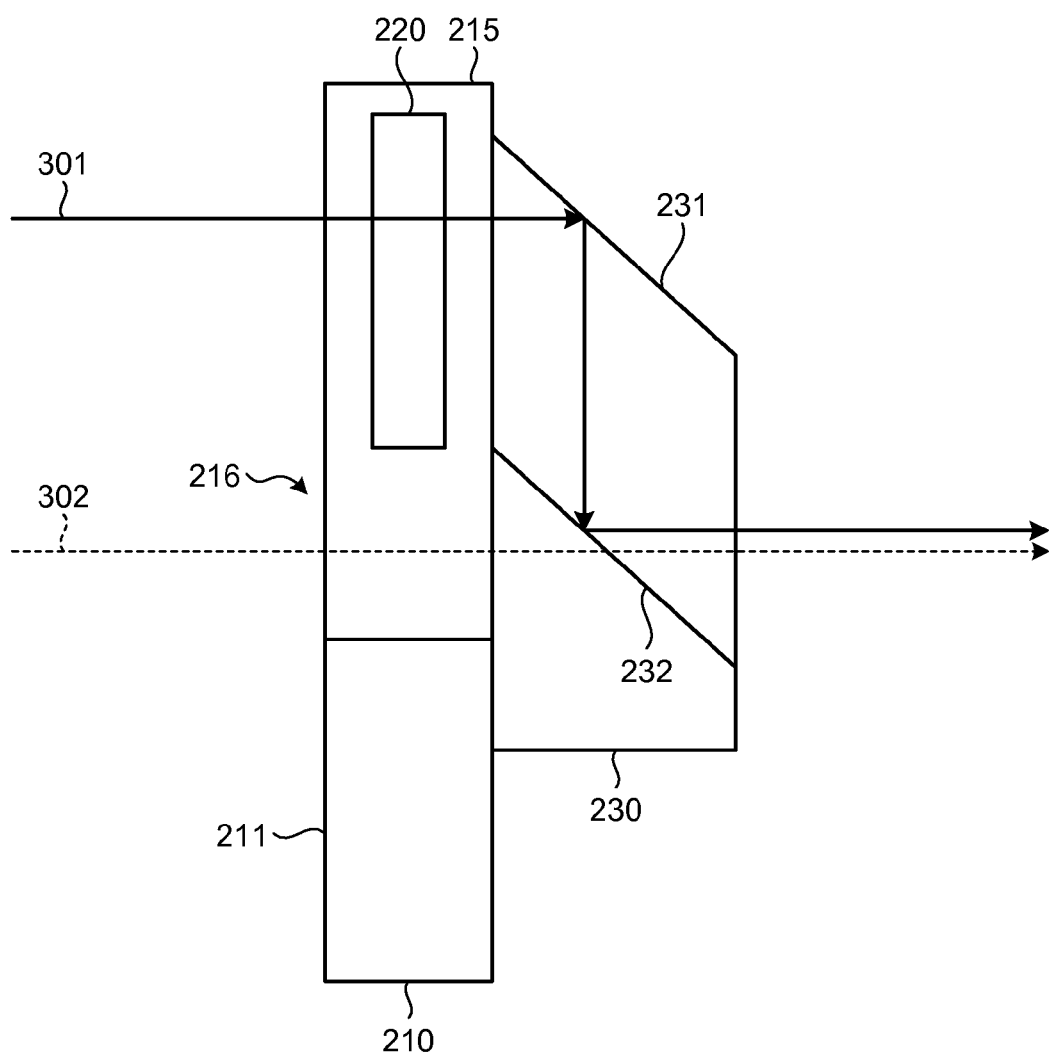
FIG. 10 is a plan view illustrating the configuration of the polarization coupler according to the fourth embodiment.
Figure 11:
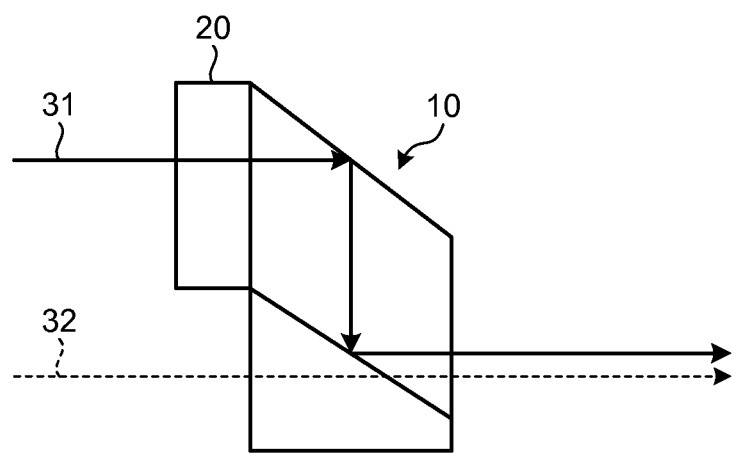
FIG. 11 illustrates one example of a configuration of a polarization coupler.

FIG. 10 is a plan view illustrating the configuration of the polarization coupler 160 according to the fourth embodiment. As illustrated in FIG. 10, a light beam 301 output from the optical modulation chip 140 passes through the wave plate 220 and then enters the PBC prism 230, while a light beam 302 passes through the notch portion 216 of the base member 210 and directly enters the PBC prism 230.

Although one side of the wave plate 220 is bonded to the arm portion 215 of the base member 210, the wave plate 220 is provided at a position distanced from the body portion 211 of the base member 210. Accordingly, a region through which the light beam 302 passes is formed between the wave plate 220 in the notch portion 216 and the body portion 211.

In the present embodiment, the light beam 301 passes through the wave plate 220 and then enters the PBC prism 230. The light beam 302 passes through a region between the wave plate 220 in the notch portion 216 and the body portions 211, and then enters the PBC prism 230. The light beam 301 is then reflected on the reflection films 231 and 232, while the light beam 302 passes through the reflection film 232. As a result, the light beams 301 and 302 whose polarization directions are perpendicular to each other are combined, and the obtained light beam is output to the lens 170.

As described in the foregoing, according to the present embodiment, the base member is formed into a substantially L shape, and the wave plate is bonded to the arm portion of the base member at a position distanced from the body portion. As a result, molding of the base member can be facilitated, and two light beams with a small pitch can be combined with a simple configuration, so that downsizing of the device can be promoted.

In the disclosed respective embodiments, the polarization couplers 160 provided in the optical modulator 100 have been described. However, the polarization couplers 160 in the respective embodiments may be applied to various optical modules different from the optical modulator. That is, the polarization couplers 160 in the aforementioned respective embodiments may be used for optical modules which are configured to combine two light beams or separate one light beam.

In the aforementioned respective embodiments, the PBC prism 230 is used as a polarization combining element that combines polarized waves. However, the present invention is not limited thereto. As a polarization combining element, birefringent crystal or the like may also be used.

According to one aspect of the polarization combiner and the optical modulation device disclosed by the present application, the effect of being able to promote downsizing of the devices is implemented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A polarization combiner comprising:
   a base member that includes a body portion, an arm portion extending from the body portion, and a notch portion surrounded with the body portion and the arm portion;
   a polarization rotating element that is fixed to the arm portion of the base member and that rotates a polarization direction of a first polarized wave; and
   a polarization combining element that is fixed to the base member so as to face the notch portion of the base member and the polarization rotating element, the polarization combining element combining two polarized waves entering from a surface facing the notch portion and the polarization rotating element, the two polarized waves including the first polarized wave whose polarization direction is rotated by the polarization rotating element and a second polarized wave passing through the notch portion, wherein
   the polarization combining element has an invalid region set as a region where a property possessed by the polarization combining element is invalid for the first and second polarized waves, and the polarization combining element is positioned and fixed to the base member so that the invalid region overlaps with an invalid region of the polarization rotating element.

2. The polarization combiner according to claim 1, wherein
the base member includes two arm portions extending from the body portion, and
the polarization rotating element is bonded to end faces at top ends of the two arm portions.

3. The polarization combiner according to claim 1, further comprising an optical element that covers at least part of the notch portion of the base member and that optically changes the second polarized wave passing through the notch portion, and wherein
the polarization combining element combines the first polarized wave whose polarization direction is rotated by the polarization rotating element and the second polarized wave having optically changed by the optical element.

4. The polarization combiner according to claim 1, wherein
the arm portion includes:
a first arm portion that extends from the body portion and that is as thick as the body portion; and
a second arm portion that extends from a top end of the first arm portion and that is thinner than the first arm portion, and
the polarization rotating element is bonded to a surface of the second arm portion which is vertical to a thickness direction of the second arm portion.

5. The polarization combiner according to claim 1, wherein the polarization rotating element is bonded to a surface of the arm portion surrounding the notch portion.

6. An optical modulation device comprising:
a modulation unit that superimposes an electrical signal on light and outputs a first light beam and a second light beam each having the electrical signal superimposed thereon; and
a combining unit that combines the first and second light beams output by the modulation unit, wherein
the combining unit includes:
a base member including a body portion, an arm portion extending from the body portion, and a notch portion surrounded with the body portion and the arm portion;
a polarization rotating element that is fixed to the arm portion of the base member and that rotates a polarization direction of the first light beam; and
a polarization combining element that is fixed to the base member so as to face the notch portion of the base member and the polarization rotating element, the polarization combining element combining the first light beam whose polarization direction is rotated by the polarization rotating element and the second light beam passing through the notch portion, wherein
the polarization combining element has an invalid region set as a region where a property possessed by the polarization combining element is invalid for the first and second light beam, and the polarization combining element is positioned and fixed to the base member so that the invalid region overlaps with an invalid region of the polarization rotating element.

7. A polarization combiner comprising:
a base member that includes a body portion, an arm portion extending from the body portion, and a notch portion surrounded with the body portion and the arm portion;
a polarization rotating element that is fixed to the arm portion of the base member and that rotates a polarization direction of a first polarized wave; and
a polarization combining element that is fixed to the base member so as to face the notch portion of the base member and the polarization rotating element, the polarization combining element combining two polarized waves entering from a surface facing the notch portion and the polarization rotating element, the two polarized waves including the first polarized wave whose polarization direction is rotated by the polarization rotating element and a second polarized wave passing through the notch portion, wherein
the arm portion includes:
a first arm portion that extends from the body portion and that is as thick as the body portion; and
a second arm portion that extends from a top end of the first arm portion and that is thinner than the first arm portion, and
the polarization rotating element is bonded to a surface of the second arm portion which is vertical to a thickness direction of the second arm portion.

8. The polarization combiner according to claim 7, further comprising an optical element that covers at least part of the notch portion of the base member and that optically changes the second polarized wave passing through the notch portion, and wherein
the polarization combining element combines the first polarized wave whose polarization direction is rotated by the polarization rotating element and the second polarized wave having optically changed by the optical element.

9. An optical modulation device comprising:
a modulation unit that superimposes an electrical signal on light and outputs a first light beam and a second light beam each having the electrical signal superimposed thereon; and
a combining unit that combines the first and second light beams output by the modulation unit, wherein
the combining unit includes:
a base member including a body portion, an arm portion extending from the body portion, and a notch portion surrounded with the body portion and the arm portion;
a polarization rotating element that is fixed to the arm portion of the base member and that rotates a polarization direction of the first light beam; and
a polarization combining element that is fixed to the base member so as to face the notch portion of the base member and the polarization rotating element, the polarization combining element combining the first light beam whose polarization direction is rotated by the polarization rotating element and the second light beam passing through the notch portion, wherein
the arm portion includes:
a first arm portion that extends from the body portion and that is as thick as the body portion; and
a second arm portion that extends from a top end of the first arm portion and that is thinner than the first arm portion, and
the polarization rotating element is bonded to a surface of the second arm portion which is vertical to a thickness direction of the second arm portion.

* * * * *